(12) United States Patent
Song (10) Patent No.: US 11,486,582 B2
(45) Date of Patent: Nov. 1, 2022

(54) ELECTRIC HEATER

(71) Applicant: LG Electronics Inc., Seoul (KR)

(72) Inventor: Misun Song, Seoul (KR)

(73) Assignee: LG Electronics Inc., Seoul (KR)

( * ) Notice: Subject to any disclaimer, the term of this patent is extended or adjusted under 35 U.S.C. 154(b) by 474 days.

(21) Appl. No.: 16/522,214

(22) Filed: Jul. 25, 2019

(65) Prior Publication Data

US 2020/0063971 A1 Feb. 27, 2020

(30) Foreign Application Priority Data

Aug. 21, 2018 (KR) .................. 10-2018-0097588

(51) Int. Cl.
| | |
|---|---|
| *H05B 3/10* | (2006.01) |
| *H05B 3/16* | (2006.01) |
| *H05B 3/26* | (2006.01) |
| *H05B 3/68* | (2006.01) |
| *F24C 7/06* | (2006.01) |

(Continued)

(52) U.S. Cl.
CPC ........... *F24C 7/062* (2013.01); *A47J 36/2483* (2013.01); *F24C 7/088* (2013.01); *H05B 3/03* (2013.01); *H05B 3/20* (2013.01); *H05B 3/26* (2013.01); *H05B 3/265* (2013.01); *H05B 3/68* (2013.01); *H05B 3/748* (2013.01); *H05B 2203/007* (2013.01); *H05B 2203/016* (2013.01); *H05B 2203/03* (2013.01)

(58) Field of Classification Search
None
See application file for complete search history.

(56) References Cited

U.S. PATENT DOCUMENTS

| | | | | |
|---|---|---|---|---|
| 4,002,883 A | * | 1/1977 | Hurko .................... | H05B 3/748 |
| | | | | 219/466.1 |
| 2003/0075537 A1 | * | 4/2003 | Okajima ........... | H01L 21/67103 |
| | | | | 219/444.1 |

(Continued)

FOREIGN PATENT DOCUMENTS

| | | |
|---|---|---|
| EP | 2618631 | 7/2013 |
| JP | 2014053574 | 3/2014 |

(Continued)

OTHER PUBLICATIONS

Extended European Search Report in European Application No. 19174083.6, dated Dec. 4, 2019, 3 pages.

*Primary Examiner* — Joseph M. Pelham
(74) *Attorney, Agent, or Firm* — Fish & Richardson P.C.

(57) ABSTRACT

An electric heater includes a substrate (an insulating material capable of forming a conductor pattern on a surface of an insulating substrate), a first plane heating element formed on one surface of the substrate, and a second plane heating element formed on one surface of the substrate to be located outside the first plane heating element. The first plane heating element includes a first pattern portion connecting a start point with an end point located in a first zone, a pair of first electrodes located outside the first zone, and a pair of first connectors connecting the first pattern portion with the first electrodes. The second plane heating element includes a second pattern portion located in a second zone surrounding the first zone and connecting a start point with an end point, and at least some of the first connectors are located in the second zone.

21 Claims, 6 Drawing Sheets

(51) Int. Cl.
*F24C 7/08* (2006.01)
*H05B 3/20* (2006.01)
*A47J 36/24* (2006.01)
*H05B 3/03* (2006.01)
*H05B 3/74* (2006.01)

(56) References Cited

U.S. PATENT DOCUMENTS

| | | | | |
|---|---|---|---|---|
| 2004/0074893 | A1* | 4/2004 | Wermbter | H05B 3/748 |
| | | | | 219/465.1 |
| 2010/0193502 | A1* | 8/2010 | Kim | H05B 3/748 |
| | | | | 219/482 |
| 2020/0060468 | A1* | 2/2020 | Song | H05B 3/74 |
| 2020/0060469 | A1* | 2/2020 | Song | H05B 3/748 |
| 2020/0063972 | A1* | 2/2020 | Song | H05B 3/74 |
| 2020/0063974 | A1* | 2/2020 | Song | F24C 7/067 |
| 2020/0063976 | A1* | 2/2020 | Song | H05B 3/03 |
| 2020/0063977 | A1* | 2/2020 | Song | H05B 3/03 |
| 2020/0068664 | A1* | 2/2020 | Song | H05B 3/26 |
| 2020/0113378 | A1* | 4/2020 | Song | H05B 3/26 |
| 2020/0120759 | A1* | 4/2020 | Song | H05B 3/748 |
| 2020/0396801 | A1* | 12/2020 | Unno | H05B 3/283 |

FOREIGN PATENT DOCUMENTS

| | | |
|---|---|---|
| KR | 20090009599 | 1/2009 |
| KR | 1020090009600 | 1/2009 |
| KR | 101525974 | 6/2015 |
| KR | 2020170002715 | 7/2017 |
| KR | 101762159 | 8/2017 |
| WO | WO2009014333 | 1/2009 |

* cited by examiner

ELECTRIC HEATER

CROSS-REFERENCE TO RELATED APPLICATIONS

This application claims the benefit of priority to Korean Patent Application No. 10-2018-0097588, filed on Aug. 21, 2018, in the Korean Intellectual Property Office, the disclosure of which is incorporated herein in its entirety.

BACKGROUND OF THE INVENTION

1. Field of the Invention

The present invention relates to an electric heater applied to a cooking appliance, and more particularly, to an electric heater having a plane heating element capable of solving asymmetrical heating even if a second pattern portion is formed outside a first pattern portion.

2. Discussion of the Related Art

In general, a cooking appliance refers to a device for heating and cooking food using gas or electricity. Various products such as a microwave oven using microwaves, an oven using a heater, a gas stove using gas, an electric stove using electricity or a cooktop including a gas stove or an electric stove have come into widespread use.

The gas stove directly generates flame using gas as a heating source, while the electric stove heats a container and food placed on a top plate thereof using electricity.

In the gas stove, heat loss caused by flame is large and contaminants are discharged due to incomplete combustion, thereby polluting room air. Therefore, recently, electric stoves are attracting attention.

Electric stoves may be classified into an inductive electric stove which directly heats a container in which a magnetic field is generated by a magnetic induction method, and a resistive electric stove which heats a top surface made of ceramic using a hot wire.

The inductive electric stove has a short cooking time at a high temperature and must use a dedicated magnetic container. The resistive electric stove may use an existing container but has a relatively long cooking time.

Although an existing resistive electric stove uses a heating element made of a nichrome wire, an electric heater using a plane heating element is being developed in order to reduce the thickness of the heating element.

In addition, in order to shorten the cooking time, a resistive electric stove using an electric heater capable of heating a limited area at a high temperature is being developed.

As an example of such an electric heater, Korean Patent Registration No. 10-1762159 B1 (Aug. 4, 2017) discloses a plane heating element including a substrate including a surface made of an electrically insulating material, a heating element attached to the surface of the substrate and having a predetermined shape, and a power supply for supplying electricity to the heating element.

In the electric heater, the temperature distribution of an object to be heated may be changed according to the shape (that is, the pattern) of the plane heating element, and the plane heating element may be formed in a shape capable of heating the object to be heated as uniformly as possible.

The plane heating element of the electric heater includes a plurality of tracks having a straight-line shape or an arc shape and adjacent tracks of the plurality of tracks may be connected through a bridge (or a track).

As another example of the heater, European Patent Publication No. EP 0,228,808A2 (published on Jul. 15, 1987) discloses a temperature sensitive device. Such a device is configured by printing a heater track made of a conductive material and a plurality of electrodes on a ceramic coating layer. As current is supplied through the electrodes, radiant heat is generated in the heater track.

However, a conventional plane heating element includes a heating portion in which one hot wire is formed in a predetermined pattern within a limited area. In order to generate heat at a temperature higher than 500° C., the heating portion is designed to have high resistance.

Accordingly, a large potential difference is generated according to the shape of the pattern or the positions of the electrodes, excessive local heating occurs in a portion in which the potential difference is large and the hot wire is destroyed.

In order to solve the above-described problems, a second plane heating element may be provided outside a first plane heating element, and one power supply supplies electricity to the first and second plane heating elements.

Figure 1A:
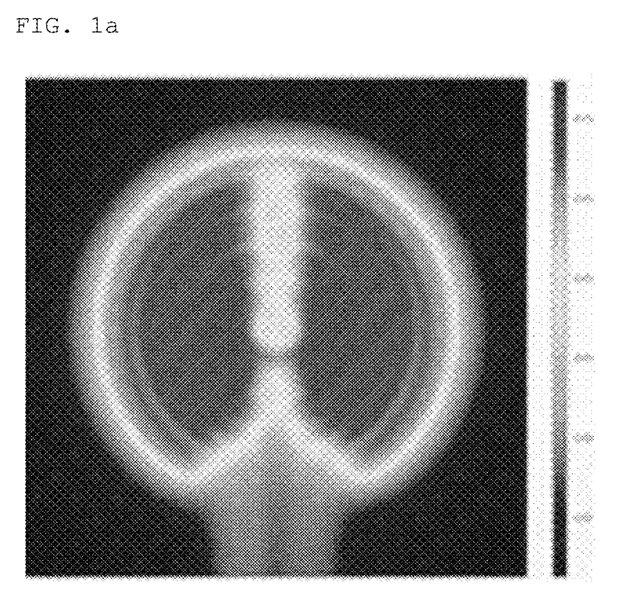
FIGS. 1a and 1b are views showing heating analysis and an actual heating state of an electric heater, to which a conventional plane heating element is applied.
Figure 1B:
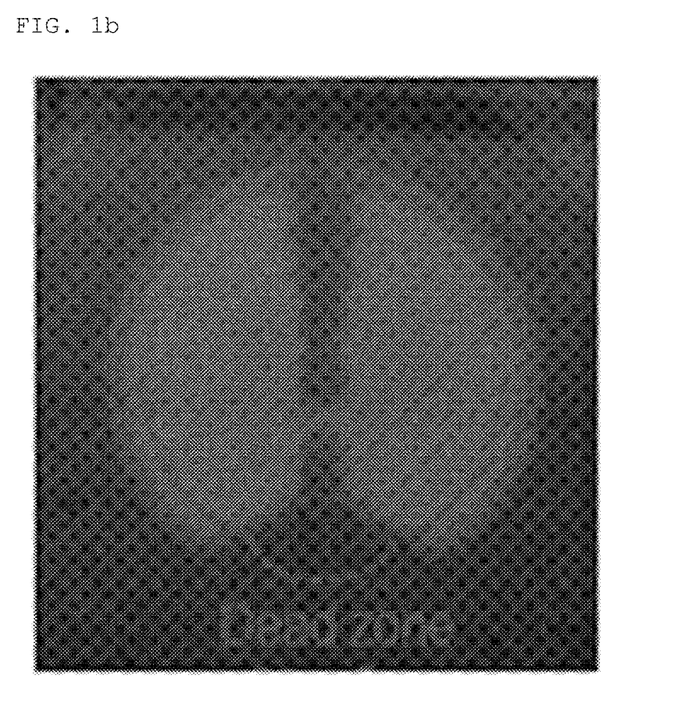

FIGS. 1a and 1b are views showing heating analysis and an actual heating state of an electric heater, to which a conventional plane heating element is applied.

According to the prior art, a second pattern portion is provided outside a first pattern portion. As shown in FIGS. 1a and 1b, a hot zone may not be formed in an entire zone, in which the first and second patterns are formed, and a dead zone is generated in a portion of the zone in which the second pattern portion is formed.

At this time, the hot zone may be defined as a zone having a temperature distribution of 500° C. or more, and the dead zone refers to a zone having a temperature distribution of 200° C. or less or a zone having a temperature distribution less than the hot zone by 300° C. or less.

That is, in the heating zone, the dead zone has a significantly lower temperature distribution than the hot zone.

In the conventional electric heater, since the dead zone is generated in the zone in which the second pattern portion is formed, the appearance of the electric heater is not aesthetically good and a user may be mistaken for a failure.

In addition, since a high-temperature area of the zone in which the second pattern portion is formed is reduced by the dead zone, the heating temperature may be decreased and heating efficiency may be decreased.

In addition, in the second pattern portion, since a dead-zone portion and a portion in the opposite direction thereof are configured in an asymmetrical shape, there is a limitation in uniformly generating heat over the entire zone in which the second pattern portion is formed.

SUMMARY OF THE INVENTION

An object of the present invention is to provide an electric heater including a plane heating element capable of removing a zone having a relatively low heat value in a zone, in which a second pattern portion is formed, even if the second pattern portion is formed outside a first pattern portion.

Another object of the present invention is to provide an electric heater including a plane heating element capable of maximally increasing a high-temperature area by a second pattern portion.

Another object of the present invention is to provide an electric heater including a plane heating element capable of heating first and second pattern portions in a symmetrical shape.

To achieve the above objects, there is provided an electric heater including a substrate (an insulating material capable of forming a conductor pattern on a surface of an insulating substrate), a first plane heating element formed on one surface of the substrate and a second plane heating element formed on one surface of the substrate to be located outside the first plane heating element, wherein the first plane heating element includes a first pattern portion connecting a start point with an end point located in a first zone, a pair of first electrodes located outside the first zone, and a pair of first connectors connecting the first pattern portion with the first electrodes, wherein the second plane heating element includes a second pattern portion located in a second zone surrounding the first zone and connecting a start point with an end point, and wherein at least some of the first connectors are located in the second zone.

In the present invention, the start point and the end point of the first pattern portion may be located at an outermost side of the first zone, and the start point and the end point of the second pattern portion may be located at an innermost side of the second zone.

In the present invention, the first pattern portion may include a plurality of first arc-shaped tracks spaced apart from each other and having a length increasing from a center to an outer side of the first zone and a plurality of first bridges connecting the first tracks in series.

At this time, the first tracks, the first bridges and the first connectors may configure a heating portion for generating heat as current flows, and the first tracks, the first bridges and the first connectors may be symmetrical with reference to a reference line passing through a center of the first zone.

For example, a width $W_1$ of each of the first connectors may be in a range of 1 to 1.5 times a width $W_{1\_0}$ of each of the first tracks, a distance $D_1$ between the first connectors may be 20 mm or more, a thickness $T_1$ of each of the first electrodes may be at least 1.5 times greater than a thickness $T_{1\_0}$ of the first pattern portion.

In the present invention, the second plane heating element may further include a pair of second electrodes located outside the first zone and a pair of second connectors connecting the second pattern portion with the second electrodes, the second connectors may be provided in parallel outside the first connectors, and at least some of the second connectors may be located in the second zone.

In the present invention, the second pattern portion may include a plurality of second arc-shaped tracks spaced apart from each other and having a length increasing from an inner side to an outer side of the second zone, and a plurality of second bridges connecting the second tracks in series.

At this time, the second tracks, the second bridges and the second connectors may configure a heating portion for generating heat as current flows, and the second tracks, the second bridges and the second connectors may be symmetrical with reference to a reference line passing through a center of the first zone.

In the present invention, the first connector and the second connector may be located between at least the pair of second bridges.

For example, a width $W_2$ of each of the second connectors is in a range of 1 to 1.5 times a width $W_{2\_0}$ of each of the second tracks, a closest distance $D_3$ between the second connector and the second bridge may be less than a distance $D_1$ between the first connectors and a distance $D_2$ between the first connector and the second connector, and a thickness $T_2$ of each of the second electrodes may be at least 1.5 times greater than a thickness $T_{2\_0}$ of the second pattern portion.

Meanwhile, the electric heater may further include a third plane heating element formed on one surface of the substrate to be located outside the second plane heating element, the third plane heating element may include a third pattern portion located in a third zone surrounding the second zone and connecting a start point with an end point and a pair of third electrodes connected to the third pattern portion, and at least some of the first connector and the second connector may be located in the third zone.

In the present invention, the start point and the end point of the third pattern portion may be located at an outermost side of the third zone, and wherein the third electrodes may be located in a direction opposite to the first electrodes and the second electrodes.

In the present invention, the third pattern portion may include a plurality of third arc-shaped tracks spaced apart from each other and having a length increasing from an inner side to an outer side of the third zone, and a plurality of third bridges connecting the third tracks in series, and the third tracks and the third bridges may be symmetrical with respect to a reference line passing through a center of the first zone.

In the present invention, some of the first connector and the second connector may be located between at least the pair of third bridges.

As described above, even if several pattern portions are formed from an inner side to an outer side, it is possible to remove a zone having a relatively low heat value, to maximally increase a heating area, and to uniformly generate heat over an entire area.

DETAILED DESCRIPTION OF THE PREFERRED EMBODIMENTS

Hereinafter, the present embodiment will be described in detail with reference to the accompanying drawings. It should be understood, however, that the scope of the inventive concept of the present embodiment may be determined from the matters disclosed in the present embodiment, and the spirit of the present invention possessed by the present embodiment includes implementations such as addition, deletion, modification etc. of components to the proposed embodiment.

Figure 2:
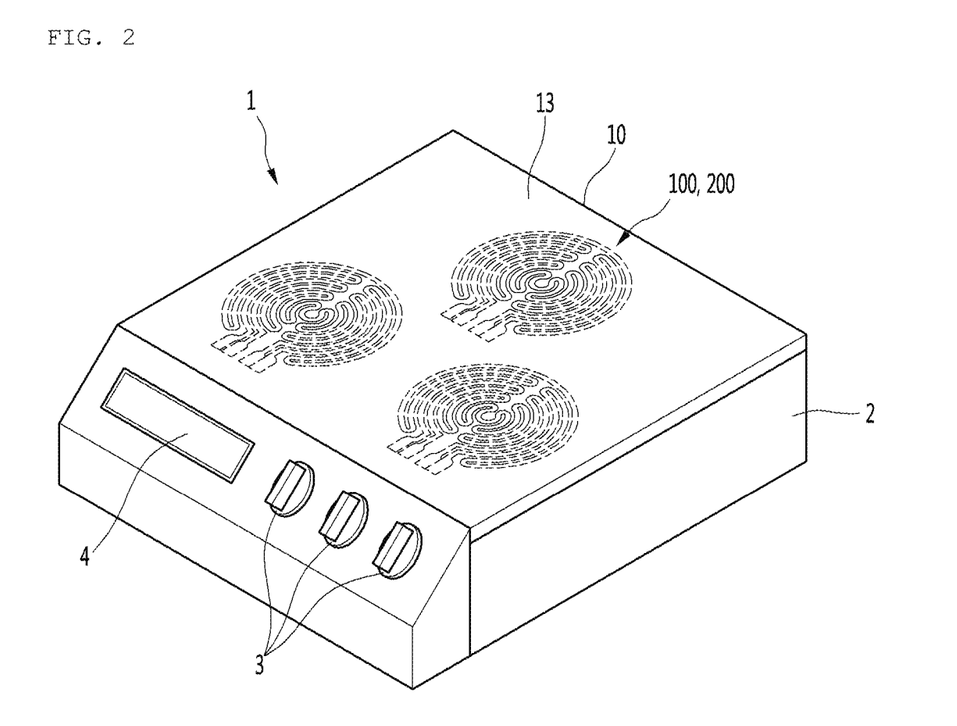
FIG. 2 is a perspective view showing an electric stove, to which an electric heater according to an embodiment of the present invention is applied.
Figure 3:
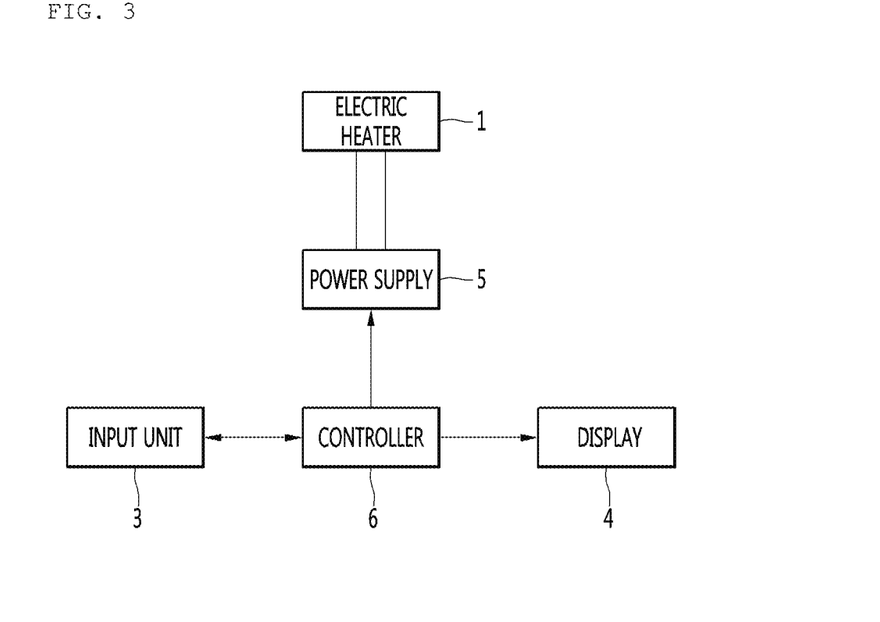
FIG. 3 is a control block diagram of an electric stove, to which an electric heater according to an embodiment of the present invention is applied.

FIG. 2 is a perspective view showing an electric stove, to which an electric heater according to an embodiment of the present invention is applied, and FIG. 3 is a control block diagram of an electric stove, to which an electric heater according to an embodiment of the present invention is applied.

The electric heater 1 of the present invention may configure a portion of an electric stove such as a cooktop.

The electric stove may include a cabinet 2 forming appearance. The electric heater 1 may be provided on the cabinet 2. The upper surface of the cabinet 2 may be opened and the electric heater 1 may be provided on the upper surface of the cabinet 2.

The electric stove may include an input unit 3 for manipulating the electric stove and a display 4 for displaying a variety of information such as information on the electric stove. In addition, the electric stove may further include a power supply 5 connected to the electric heater 1 to apply current to the electric heater 1. The electric stove may further include a controller 6 for controlling the power supply 5 and the display 4 according to input of the input unit 3.

The electric heater 1 may be provided on the cabinet 2 such that the upper surface thereof is exposed to the outside. An object to be heated by the electric stove may be placed on the upper surface of the electric heater 1, and the upper surface of the electric heater 1 may be a surface in which the object to be heated is seated.

Figure 4:
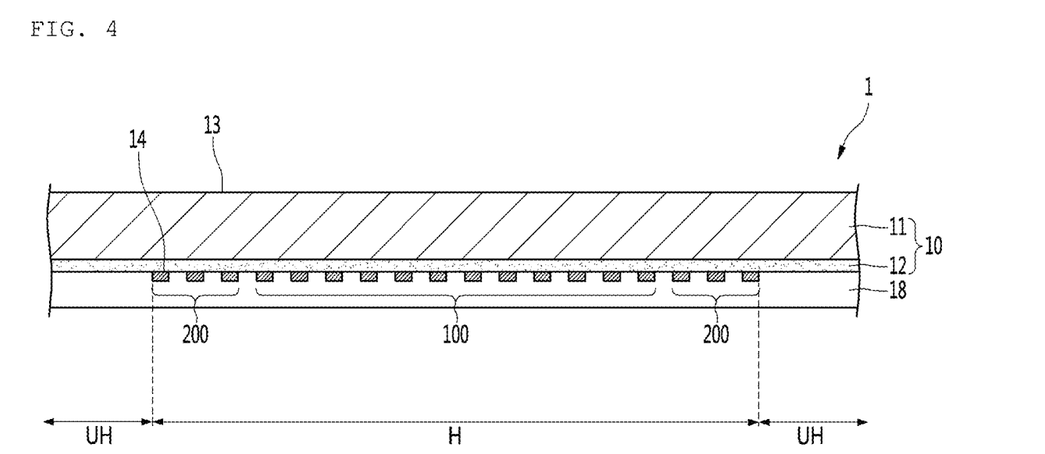
FIG. 4 is a cross-sectional view showing an electric heater according to an embodiment of the present invention.

FIG. 4 is a cross-sectional view showing an electric heater according to an embodiment of the present invention.

The electric heater 1 may include a substrate 10 and a plurality of plane heating elements 100 and 200 formed on one surface of the substrate 10. The plane heating elements 100 and 200 may define or be referred to as a first annular heating zone and a second annular heating zone, respectively.

The substrate 10 may be an insulating substrate having a conductor pattern formed on a surface thereof. The upper surface of the substrate 10 may be a surface 13 in which the object to be heated is seated. The lower surface of the substrate 10 may be a surface 14 in which the plane heating elements 100 and 200 are formed.

The substrate 10 may include only a base 11 formed of an insulating material or may include a base 11 formed of an insulating material or a non-insulating material and an insulating layer 12 formed on one surface of the base 11.

The base 11 may be glass and the insulating layer 12 may be formed on the lower surface of the glass using a coating or a printing method.

The plane heating elements 100 and 200 may be directly formed on one surface of the base 11 formed of an insulating material or may be formed on the insulating layer 12.

The base 11 may be formed in a shape of a plate on which the object to be heated is placed or in a shape of a container in which the object to be heated is received.

The insulating layer 12 may be formed on the lower surface of the base 11. The insulating layer 12 may be formed on the entire lower surface of the base 11 or may be formed on a portion of the lower surface of the base 11. The insulating layer 12 may be formed only in a zone in which the plane heating elements 100 and 200 will be formed. The insulating layer 12 may configure the entire lower surface of the substrate 10 or a portion of the lower surface of the substrate 10.

The plane heating elements 100 and 200 may be formed on the lower surface 14 of the insulating layer 12. The plane heating elements 100 and 200 may have a size smaller than the substrate 10 and the lower surface of the substrate 10 may have a heated zone H, in which the plane heating elements 100 and 200 is formed, and an unheated zone UH located around the heated zone H.

The heater 1 may further include a coating layer 18 surrounding the plane heating elements 100 and 200. The coating layer 18 may be formed of an electrically insulating material to protect the plane heating elements 100 and 200.

The substrate 10 of the present embodiment may be formed of a flexible material, such as a flexible insulating film. In this case, the electric heater 1 may be a flexible planar heater. Such a flexible planar heater may be attached to a member, on which the object to be heated is placed, to heat the object to be heated, like the upper plate of the electric stove.

FIGS. 5 to 8 are views showing a dual pattern type plane heating element according to an embodiment of the present invention.

The dual pattern type plane heating element according to the present invention includes a first plane heating element 100, a second plane heating element 200 on the same plane as shown in FIGS. 5 to 8. The first plane heating element 100 is centrally located and the second plane heating element 200 is located to surround the first plane heating element 100.

Figure 5:
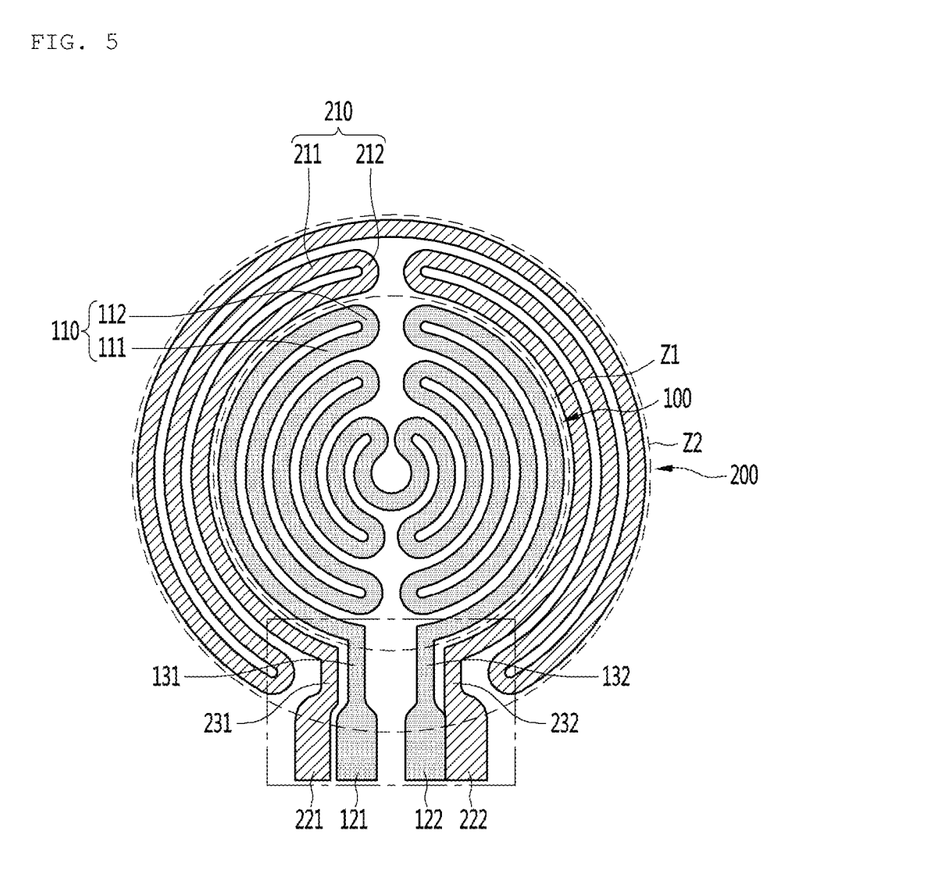
FIG. 5 is a plan view showing a dual pattern type plane heating element according to a first embodiment of the present invention.

The first plane heating element 100 is composed of one hot wire, and includes a first pattern portion 110 in which the hot wire is arranged in a first zone Z1 in a predetermined shape, a pair of first electrodes 121 and 122 for supplying current to the first pattern portion 110, and a pair of first connectors 131 and 132 connecting the first pattern portion 110 with the first electrodes 121 and 122.

The first pattern portion 110 and the first connectors 131 and 132 are configured as a heating portion for generating heat as current is supplied, but the first electrodes 121 and 122 may be configured as a non-heating portion which hardly generates heat or has a significantly lower heat value than the heating portion.

The second plane heating element 200 is composed of another hot wire different from that of the first plane heating element 100, and includes a second pattern portion 210, in which the hot wire is arranged in a predetermined shape in a second zone Z2 surrounding the first zone Z1, a pair of second electrodes 221 and 222 for supplying current to the second pattern portion 210, and a pair of second connectors 231 and 232 connecting the second pattern portion 210 with the second electrodes 221 and 222.

The second pattern portion 210 and the second connectors 231 and 232 may be configured as a heating portion like the first pattern portion 110 and the first connectors 131 and 132, and the second electrodes 221 and 222 may be configured as a non-heating portion like the first electrodes 121 and 122.

The first zone Z1 is a limited area which is centrally located, the first pattern portion 110 is located in the first zone Z1, the second zone Z2 is a limited area surrounding the first zone Z1, and the second pattern portion 210 is located in the second zone Z2.

The areas of the first and second zones Z1 and Z2 may be designed to be proportional to required power P.

According to the embodiment, the first zone Z1 has a circular shape such as a circle or an ellipse, and the second zone Z2 has a ring shape and located outside the first zone Z1. Of course, the diameters of the first and second zones Z1 and Z2 increase as required power P increases.

The first pattern portion 110 is configured as a main heating portion closely arranged in the first zone Z1, and is configured by connecting a start point with an end point located at the outermost side of the first zone Z1, and is configured to be horizontally symmetrical with respect to the center of the first pattern portion 110 shown in FIG. 5.

Of course, the length of the hot wire configuring the first pattern portion 110 may be set in proportion to the size of the first zone Z1, that is, the required power P, and the hot wire may be formed along various paths between the start point and the end point.

According to the embodiment, the first pattern portion 110 may include a plurality of arc-shaped first tracks 111 having a length increasing from the center thereof to the outer side thereof in a left-and-right direction and arranged in a diameter direction at a predetermined distance, and a plurality of first bridges 112 connecting the first tracks 111 in series.

Accordingly, the first tracks 111 and the first bridges 112 may be configured in a horizontally symmetrical shape, and heat is generated in the first zone Z1 in a horizontally symmetrical shape.

In addition, the first tracks 111 have a vertical symmetrical shape and the first bridges 112 have a vertical asymmetrical shape. However, since the first tracks 111 and the first bridges 112 are formed in the entire first zone Z1, heat is generated in the first zone Z1 in a vertically symmetrical shape.

The second pattern portion 210 is configured as a main heating portion closely arranged in the second zone Z2, and is configured by connecting a start point with an end point located at the innermost side of the second zone Z2, and is configured to be horizontally symmetrical with respect to the center of the first pattern portion 110 shown in FIG. 5.

Of course, the length of the hot wire configuring the second pattern portion 210 may be set in proportion to the size of the second zone Z2, that is, the required power P, and the hot wire may be formed along various paths between the start point and the end point.

At this time, the start point and the end point of the second pattern portion 210 are located adjacent to the start point and the end point of the first pattern portion 110. By this configuration, when current flows along the first and second pattern portions 110 and 210, it is possible to reduce a potential difference between the first and second pattern portions 110 and 210.

According to the embodiment, the second pattern portion 210 may include a plurality of second tracks 211 and a plurality of bridges 212, similarly to the first pattern portion 110.

In addition, the distance between the second bridges 212 is relatively greater than the distance between the first bridges 112 such that the start point and the end point of the first pattern portion 110 are connected to the first electrodes 131 and 132, and the first and second connectors 131, 132, 231 and 232 are located between the second bridges 212.

Accordingly, the second tracks 211 and the second bridges 212 may be configured in a horizontally symmetrical shape, and heat is generated in the second zone Z2 in a horizontally symmetrical shape.

In addition, the second tracks 211 have a vertical symmetrical shape and the second bridges 212 have a vertical asymmetrical shape. However, since the first and second connectors 131, 132, 231 and 232 are located between the second bridges 212, heat is generated in the second zone Z2 in a vertically symmetrical shape.

The length and width of and distance between the hot wires configuring the first and second pattern portions 110 and 210 may be variously designed according to required power and materials, without being limited thereto.

The first electrodes 121 and 122 include a first positive electrode 121 for receiving current and a first negative electrode 122 for outputting current. The first positive electrode 121 and the first negative electrode 122 may be horizontally located.

The first electrodes 121 and 122 are configured as a non-heating portion having a relatively lower heat value than the first pattern portion 110 and the first connectors 131 and 132, and the first and second electrodes 121 and 122 having a relatively low heat value may not be formed in a heating zone, in which an object to be heated is placed, that is, the first and second zones Z1 and Z2.

Accordingly, the first electrodes 121 and 122 may be located outside the second zone Z2, which is located outside the heating zone.

Similarly, the second electrodes 221 and 222 may include a second positive electrode 221 and a second negative electrode 222 located outside the second zone Z1, and may be horizontally located at both sides of the first positive electrode 121 and the second negative electrode 122.

At this time, the first and second positive electrodes 121 and 221 are connected to respective external input terminals to selectively receive current, and are spaced apart from each other.

In contrast, the first and second negative electrodes 122 and 222 are connected to the ground and may be connected to each other.

The first and second electrodes 121, 122, 221 and 222 may be located outside the first and second zones Z1 and Z2, in which a cooking container such as a pot or a frying fan is placed, may be connected to external terminals through soldering, a conductive adhesive or a paste.

However, if the first and second electrodes 121, 122, 221 and 222 are excessively heated, connection portions of the first and second electrodes 121, 122, 221 and 222 may be damaged.

Figure 7:
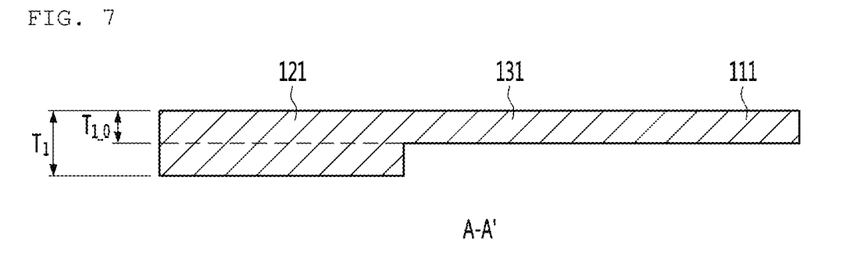
FIG. 7 is a cross-sectional view taken along line A-A' of FIG. 6.
Figure 8:
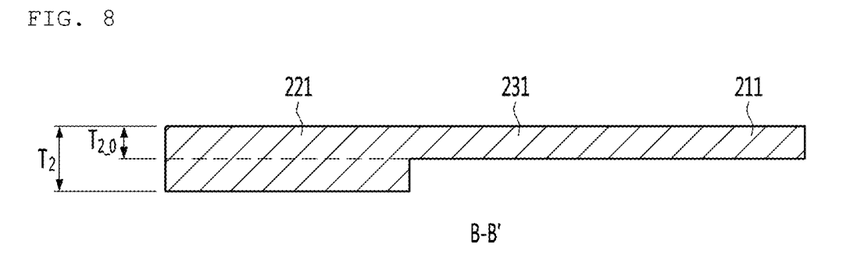
FIG. 8 is a cross-sectional view taken along line B-B' of FIG. 6.

Accordingly, the first and second electrodes 121, 122, 221 and 222 may be configured to lower resistance of the first and second electrodes 121, 122, 221 and 222 as shown in FIGS. 7 to 8, in order to prevent excessive heating to a maximum of 200° C. or more.

According to the embodiment, the thicknesses $T_1$ and $T_2$ of the first and second electrodes 121, 122, 221 and 222 may be at least 1.5 times greater than the thicknesses $T_{1\_0}$ and $T_{2\_0}$ of the first and second pattern portions 110 and 210 or the first and second connectors 131, 132, 231 and 232.

That is, the first and second pattern portions 110 and 210 and the first and second electrodes 121, 122, 221 and 222 and the first and second connectors 131, 132, 231 and 232 are coated with the same thickness $T_{1\_0}$ and $T_{2\_0}$, and over-coating may be performed at the positions of the first and second electrodes 121, 122, 221 and 222 with predetermined thicknesses $T_1-T_{1\_0}$ and $T_2-T_{2\_0}$ or printing may be performed twice or more, without being limited thereto.

The first connectors 131 and 132 are configured as an auxiliary heating portion for generating heat at the same temperature as the first pattern portion 110, is extended from the start point and the end point of the first pattern portion 110 to the first electrodes 121 and 122, and is provided in the second zone Z2.

One first connector 131 connects the start point of the first pattern portion 110 with the first positive electrode 121, and the other first connector 132 connects the end point of the first pattern portion 110 with the first negative electrode 122.

Since the first connectors 131 and 132 are directly connected to the first positive electrode 121 and the first negative electrode 122, a large potential difference between the first connectors 131 and 132 is generated while current flows, and the first connectors 131 and 132 may be short-circuited.

Accordingly, in order to prevent the short-circuit between the first connectors 131 and 132, the first connectors 131 and 132 should be far from each other to maintain an insulation gap and may be located in parallel with each other such that a distance $D_1$ between the first connectors 131 and 132 is 20 mm or more, without being limited thereto.

Similarly, the second connectors 231 and 232 are configured as an auxiliary heating portion for generating heat at the same temperature as the second pattern portion 210, is extended from the start point and the end point of the second pattern portion 120 to the second electrodes 221 and 222, and is provided in the second zone Z2.

One second connector 231 connects the start point of the second pattern portion 210 with the second positive electrode 221, and the other second connector 232 connects the end point of the second pattern portion 210 with the second negative electrode 222.

The second connectors 231 and 232 may be located outside the first connectors 131 and 132 in parallel with each other.

Figure 6:
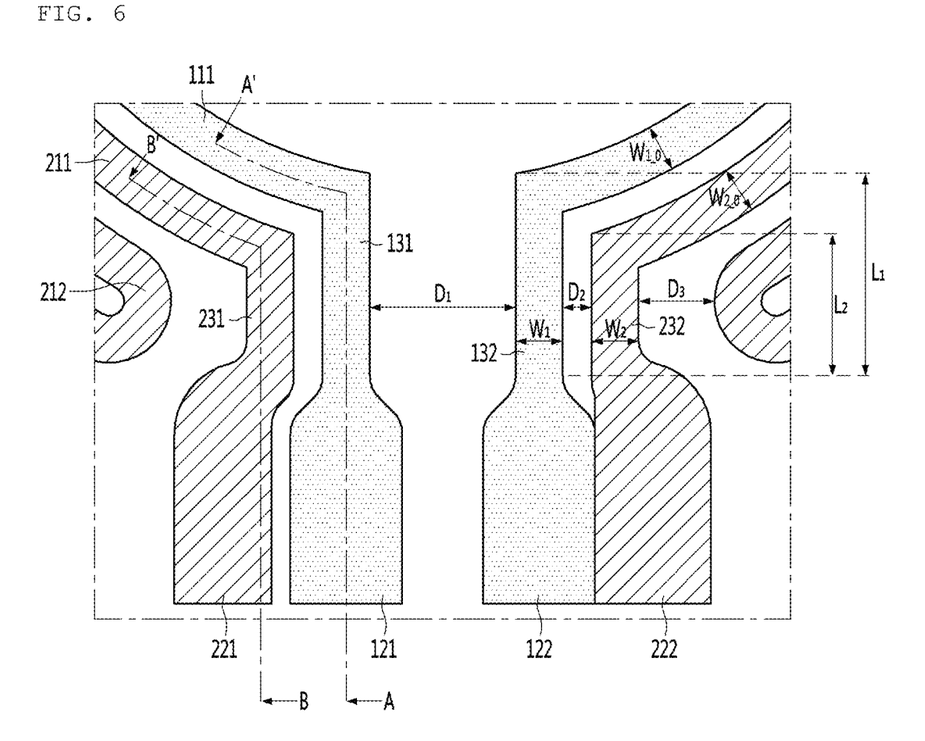
FIG. 6 is an enlarged view of first and second connectors applied to FIG. 5.

The first and second connectors 131, 132, 231 and 232 may be located between at least a pair of second bridges 212 in a straight-line shape, as shown in FIG. 6, and the length and width thereof and the distances therebetween may be controlled.

Of course, the length $L_1$ of the first connectors 131 and 132 is greater than the length $L_2$ of the second connectors 231 and 232.

Specifically, the first and second connectors 131, 132, 231 and 232 have a straight-line shape and have a limited length which can be included in a certain region. Therefore, there is a limitation in increasing the length of the hot wire in order to further increase resistance for a sufficient heating temperature.

According to the embodiment, in order to increase the resistance of the first and second connectors 131, 132, 231 and 232, the widths $W_1$ and $W_2$ of the first and second connectors 131, 132, 231 and 232 may be in a range of 1 to 1.5 times the widths $W_{1\_0}$ and $W_{2\_0}$ of the first and second tracks 111 and 211, without being limited thereto.

In addition, while current flows, a potential difference is generated between the first and second connectors 131, 132, 231 and 232 and the second bridges 112 and 212 located adjacent to each other. The distances therebetween may be large in order to maintain the insulation gap.

According to the embodiment, the distance $D_1$ between the first connectors 131 and 132 having a largest potential difference is largest and the distance $D_2$ between the first and second connectors 131, 132, 231 and 232 having a smallest potential difference is smallest.

In addition, the distance $D_3$ between the adjacent second connectors 231 and 232 and the second bridges 212 may be less than the distance $D_1$ between the first connectors 131 and 132 and may be greater than the distance $D_2$ between the first and second connectors 131, 132, 231 and 232, without being limited thereto.

Figure 9A:
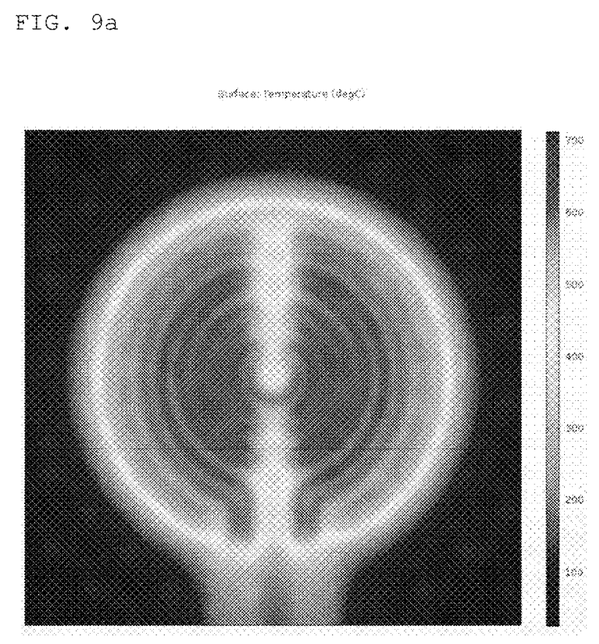
FIGS. 9a and 9b are views showing heating analysis and an actual heating state of an electric heater, to which the dual pattern type plane heating element according to the first embodiment of the present invention is applied.
Figure 9B:
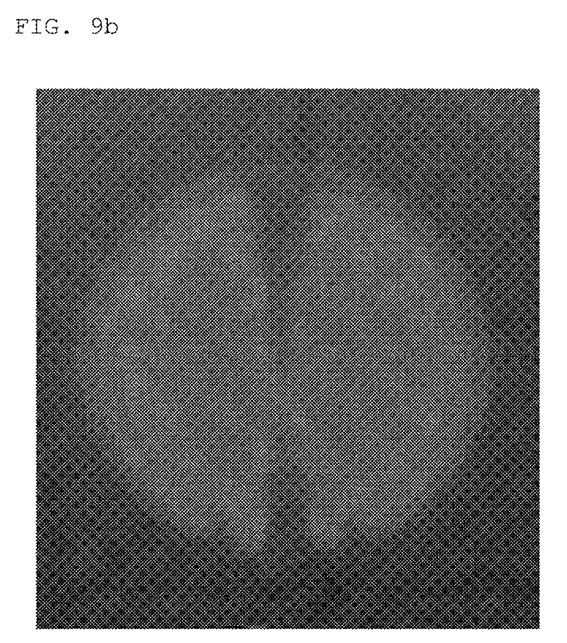

FIGS. 9a and 9b are views showing heating analysis and an actual heating state of an electric heater, to which the dual pattern type plane heating element according to the first embodiment of the present invention is applied.

In the dual pattern type plane heating element according to the present invention, as shown in FIGS. 9a and 9b, the first and second pattern portions and the first and second connectors are formed over the entire first and second zones, the first and second zones are displayed in red at 600° C. or more and heat is generated in a horizontal symmetrical shape and a vertical symmetrical shape.

Accordingly, since in the entire first and second zones are heated to a high temperature of 600° C. or more without the dead zone having a relatively low heat value, it is possible to shorten a cooking time.

In contrast, since the first and second electrodes having lower resistance than the first and second pattern portions are formed outside the second zone, the outer portion of the second zone is displayed in black at 200° C. or less and excessive heating does not occur.

Accordingly, it is possible to prevent excessive heating of the first and second electrodes and to secure reliability in portions connected to external terminals.

Figure 10:
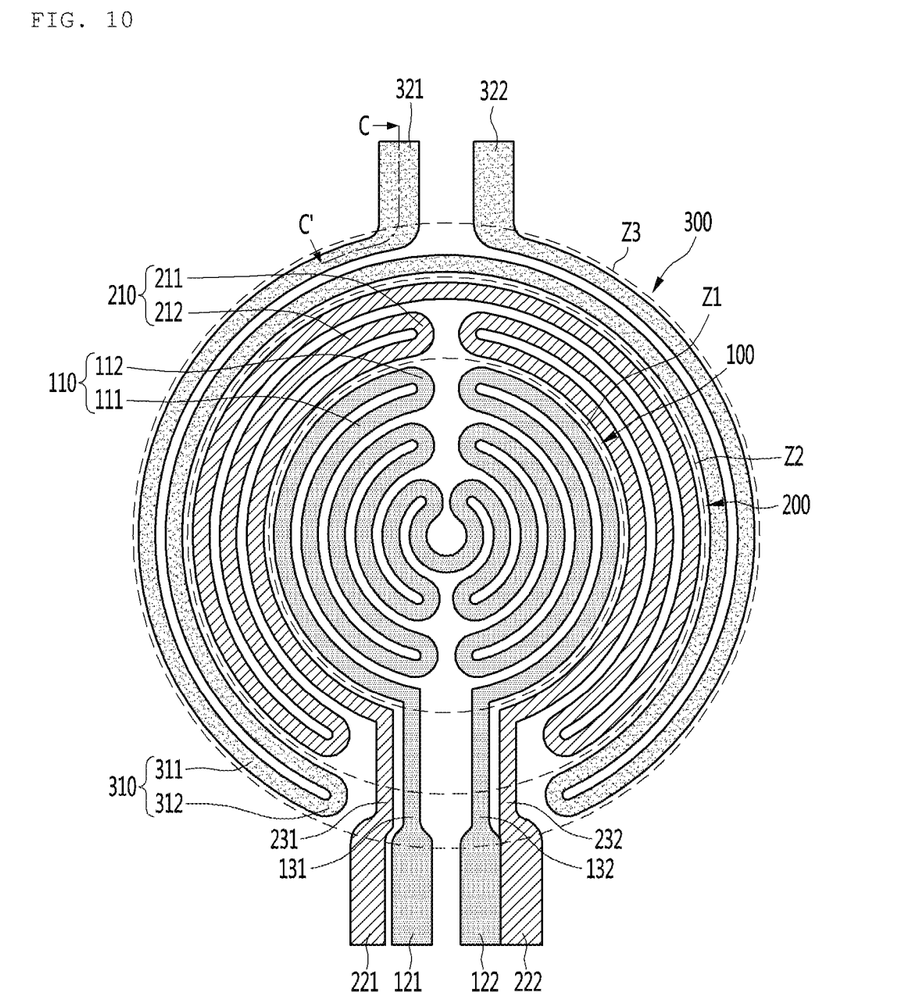
FIG. 10 is a plan view showing a triple pattern type plane heating element according to a second embodiment of the present invention.
Figure 11:
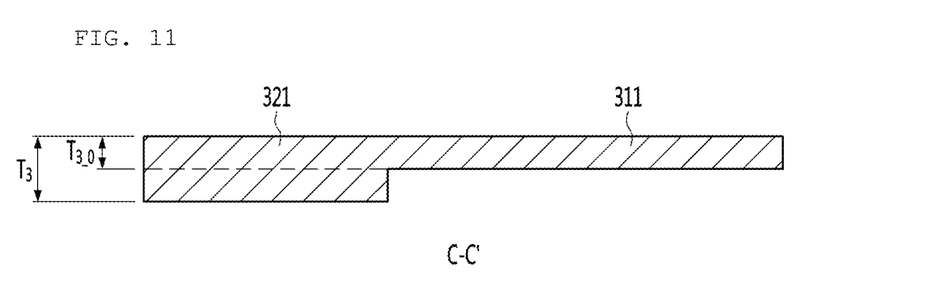
FIG. 11 is a cross-sectional view taken along line C-C' of FIG. 10.

FIGS. 10 to 11 are views showing a triple pattern type plane heating element according to a second embodiment of the present invention.

The triple pattern type plane heating element according to the present invention includes a first plane heating element 100, a second plane heating element 200 and a third plane heating element 300 on the same plane as shown in FIGS. 10 to 11. The first plane heating element 100 is centrally located, the second plane heating element 200 is located to surround the first plane heating element 100, and the third plane heating element 300 is located to surround the second plane heating element 200. The third plane heating element 300 may define or be referred to as a third annular heating zone.

The first plane heating element 100 and the second plane heating element 200 have the same configuration as those of the above-described dual pattern type electric heater and thus a detailed description thereof will be omitted.

The third plane heating element 300 is composed of another hot wire different from those of the first and plane heating elements 100 and 200, and includes a third pattern portion 310, in which the hot wire is arranged in a predetermined shape in a third zone Z3 surrounding the second zone Z2, and a pair of third electrodes 321 and 322 for supplying current to the third pattern portion 310.

The third zone Z3 is a ring-shaped zone in which the third pattern portion 310 is located and is configured outside the second zone Z2, and the area or diameter thereof may be designed to be proportional to required power P.

At this time, the first, second and third electrodes 121, 122, 221, 222, 321 and 322 are located outside the third zone Z3 and the first and second connectors 121, 122, 221 and 222 are located to cross the second and third zones Z2 and Z3.

The third pattern portion 310 is configured as a heating portion closely arranged in the second zone Z3, and is configured by connecting a start point with an end point located at the outermost side of the third zone Z3, and is configured to be horizontally symmetrical with respect to the center of the first pattern portion 110 shown in FIG. 10.

Of course, the length of the hot wire configuring the third pattern portion 310 is set in proportion to the size of the third zone Z3, that is, required power P, and the hot wire may be formed along various paths between the start point and the end point.

According to the embodiment, the third pattern portion 310 may include a plurality of third tracks 311 and a plurality of third bridges 312, similarly to the first and second pattern portions 110 and 210, and the first and second connectors 131, 132, 231 and 232 are located between at least a pair of third bridges 312.

Accordingly, the third pattern portion 310 is configured in a horizontally symmetrical shape similarly to the second pattern portion 210, and heat may be generated in the third zone Z3 in a horizontally symmetrically shape.

In addition, since the third pattern portion 310 is configured in a vertically asymmetrical shape and the first and second connectors 131, 132, 231 and 232 are between the third bridges 312, heat may be generated in the third zone Z3 in a vertically symmetrical shape.

The third electrodes 321 and 322 are configured as a non-heating portion having a significantly lower heat value than the third pattern portion 310, include a third positive electrode 321 connected to the start point of the third pattern portion 310 and a third negative electrode 322 connected to the end point of the third pattern portion 310, and are located in the direction opposite to the first and second electrodes 121, 122, 221 and 222.

Of course, the third electrodes 321 and 322 may be located in the same direction as the first and second electrodes 121, 122, 221 and 222 in consideration of the connection position of the external terminal and may be horizontally provided outside the first and second electrodes 121, 122, 221 and 222.

As described above, even if several pattern portions are formed, the connectors connecting the pattern portion with the electrode are included and the connectors are located in the zone in which the pattern portion is formed, thereby generating heat.

The electric heater of the present invention includes a plane heating element applicable to a cooking appliance. Even if the planner heating element is configured by a plurality of pattern portions, it is possible to remove a dead zone having a significantly low heat value of a heating zone, to maximally increase a heating area, and to uniformly heat the heating zone in a horizontally symmetrical shape and a vertically symmetrical shape.

According to the electric heater of the present invention, a second pattern portion is formed in a second zone surrounding a first pattern portion formed in a first zone, the first pattern portion is connected with first electrodes by first connectors capable of generating heat, and the first connectors are located in the second zone in which the second pattern portion is formed.

Accordingly, the first connectors are formed in a dead zone having a relatively low heat value of the second zone, in which the second pattern portion is formed, to generate heat, thereby improving the aesthetics of the electric heater and preventing a user from being mistaken for a failure.

In addition, as the second pattern portion and the first and second connectors located in the second zone generate heat, it is possible to maximally increase the heating area of the second zone and to increase the heating temperature and the heating efficiency.

In addition, since the second pattern portion and the first and second connectors located in the second zone are symmetrically configured, it is possible to uniformly generate heat over the entire second zone.

According to the present invention, since the widths $W_1$ and $W_2$ of the first and second connectors are in a range of 1 to 1.5 times the thicknesses $W_{1\_0}$ and $W_{2\_0}$ of the hot wire, even if the first and second connectors are formed in a limited portion of the second zone, it is possible to efficiently increase the heating temperature.

According to the present invention, since the distance $D_1$ between the first connectors directly connected to the first electrodes is greater than the distances $D_2$ and $D_3$ between the adjacent hot wires of the first and second patterns, it is possible to maintain a sufficient insulation gap between the first connectors. Therefore, it is possible to prevent dielectric breakdown.

Accordingly, since the pattern portions and the connectors are formed in the hot zone, the electrodes are formed outside the hot zone, and the electrodes have a relatively larger thickness than the pattern portions, it is possible to efficiently prevent excessive heating of the electrodes.

What is claimed is:

1. An electric heater comprising:
a substrate;
a first annular heating zone located at a first area of a surface of the substrate;
a second annular heating zone that is located at a second area of the surface of the substrate outside the first annular heating zone and surrounds the first annular heating zone;
a first pattern portion that is located in the first annular heating zone;
a pair of first electrodes located outside the first annular heating zone; and
a pair of first connectors that are connected to the first pattern portion and connect the first pattern portion to the pair of first electrodes,
wherein the first pattern portion comprises:
a plurality of first tracks that have an arc shape and are spaced apart from one another, and
a plurality of first bridges that connect the plurality of first tracks in series,
wherein the electric heater further comprises a second pattern portion located in the second annular heating zone, and
wherein at least a portion of the pair of first connectors extends to the second annular heating zone and defines a heating portion in the second annular heating zone configured to generate heat based on a flow of electric current through the first annular heating zone.

2. The electric heater of claim 1, wherein the plurality of first tracks are arranged between an inner side of the first annular heating zone and an outer side of the first annular heating zone radially outward of the inner side of the first annular heating zone with respect to a center of the first annular heating zone, lengths of the plurality of first tracks increasing from the inner side of the first annular heating zone to the outer side of the first annular heating zone, and
wherein the plurality of first tracks, the plurality of first bridges, and the pair of first connectors are configured to generate heat based on the flow of electric current through the first annular heating zone.

3. The electric heater of claim 2, wherein each of the plurality of first tracks, the plurality of first bridges, and the pair of first connectors is symmetrical with respect to a reference line that passes through the center of the first annular heating zone.

4. The electric heater of claim 2, wherein a width of each of the pair of first connectors is in a range from 1 to 1.5 times greater than a width of each of the plurality of first tracks in a direction parallel to the substrate.

5. The electric heater of claim 2, wherein a distance between the pair of first connectors is greater than or equal to 20 mm.

6. The electric heater of claim 1, wherein a thickness of each of the pair of first electrodes is at least 1.5 times greater than a thickness the first pattern portion in a direction orthogonal to the substrate.

7. The electric heater of claim 1, further comprising:
   a pair of second electrodes located outside the first annular heating zone; and
   a pair of second connectors that connect the second pattern portion to the pair of second electrodes,
   wherein the pair of second connectors are located outside the pair of first connectors and extend in a direction parallel to the pair of first connectors, and
   wherein at least a portion of the pair of second connectors are located in the second annular heating zone.

8. The electric heater of claim 7, wherein the second pattern portion comprises:
   a plurality of second tracks that have an arc shape, that are spaced apart from one another, and that are arranged between an inner side of the second annular heating zone and an outer side of the second annular heating zone radially outward of the inner side of the second annular heating zone with respect to a center of the first annular heating zone, lengths of the plurality of second tracks increasing from the inner side of the second annular heating zone to the outer side of the second annular heating zone; and
   a plurality of second bridges that connect the second tracks in series, and
   wherein the plurality of second tracks, the plurality of second bridges, and the pair of second connectors define another heating portion configured to generate heat based on a flow of electric current through the second annular heating zone.

9. The electric heater of claim 8, wherein each of the plurality of second tracks, the plurality of second bridges, and the pair of second connectors is symmetrical with respect to a reference line that passes through the center of the first annular heating zone.

10. The electric heater of claim 9, wherein the pair of first connectors and the pair of second connectors are located between at least a pair of second bridges among the plurality of second bridges.

11. The electric heater of claim 9, wherein a width of each of the pair of second connectors is in a range from 1 to 1.5 times greater than a width of each of the plurality of second tracks in a direction parallel to the substrate.

12. The electric heater of claim 9, wherein a minimum distance between one of the pair of second connectors and one of the plurality of second bridges is less than a distance between the pair of first connectors and less than a distance between one of the pair of first connectors and one of the pair of second connectors.

13. The electric heater of claim 7, wherein a thickness of each of the pair of second electrodes is at least 1.5 times greater than a thickness of the second pattern portion in a direction orthogonal to the substrate.

14. The electric heater of claim 7, further comprising:
   a third annular heating zone that is located at a third area of the surface of the substrate outside the second annular heating zone and surrounds the second annular heating zone;
   a third pattern portion that is located in the third annular heating zone; and
   a pair of third electrodes connected to the third pattern portion, and
   wherein at least a portion of the pair of first connectors and at least a portion of the pair of second connectors extend to the third annular heating zone.

15. The electric heater of claim 14, wherein the pair of third electrodes are located at a position opposite to the first pair of electrodes and the pair of second electrodes.

16. The electric heater of claim 15, wherein the third pattern portion comprises:
   a plurality of third tracks that have an arc shape, that are spaced apart from one another, and that are arranged between an inner side of the third annular heating zone and an outer side of the third annular heating zone radially outward of the inner side of the third annular heating zone with respect to a center of the first annular heating zone, lengths of the plurality of third tracks increasing from the inner side of the third annular heating zone to the outer side of the third annular heating zone; and
   a plurality of third bridges that connect the plurality of third tracks in series, and
   wherein each of the plurality of third tracks and the plurality of third bridges is symmetrical with respect to a reference line that passes through the center of the first annular heating zone.

17. The electric heater of claim 16, wherein at least a portion of the pair of first connectors and at least a portion of the pair of second connectors are located between at least a pair of third bridges among the plurality of third bridges.

18. The electric heater of claim 1, wherein the first annular heating zone has a circular shape, and the second annular heating zone has a ring shape surrounding the first annular heating zone, and
   wherein at least the portion of the pair of first connectors is located within the second annular heating zone and configured to generate heat in the second annular heating zone based on the flow of electric current through the first annular heating zone.

19. The electric heater of claim 1, further comprising a third annular heating zone located at a third area of the surface of the substrate outside the second annular heating zone and surrounds the second annular heating zone, and
   wherein at least the portion of the pair of first connectors extends from the second annular heating zone to the third annular heating zone and is configured to generate heat in the second annular heating zone and the third annular heating zone based on the flow of electric current through the first annular heating zone.

20. An electric heater comprising:
   a substrate;
   a first annular heating zone located at a first area of a surface of the substrate;
   a second annular heating zone located at a second area of the surface of the substrate that is located radially outside the first annular heating zone;
   a first pattern portion disposed in the first annular heating zone;
   a pair of first electrodes located outside the first pattern portion; and
   a pair of first connectors that are connected to the first pattern portion and connect the first pattern portion to the pair of first electrodes, and
   wherein the electric heater further comprises a second pattern portion that surrounds the first pattern portion, wherein the second pattern portion defines an opening at a side of the second pattern portion, and wherein at least a portion of the pair of first connectors extends to the opening defined at the side of the second pattern portion and defines a heating portion configured to generate heat based on a flow of electric current through the first annular heating zone.

21. An electric heater comprising:

a substrate;

a first annular heating zone located at a first area of a surface of the substrate;

a second annular heating zone located at a second area of the surface of the substrate that is located radially outside the first annular heating zone;

a first pattern portion disposed in the first annular heating zone;

a pair of first electrodes located outside the first pattern portion;

a pair of first connectors that are connected to the first pattern portion and connect the first pattern portion to the pair of first electrodes; and a second pattern portion that is disposed in the second annular heating zone and surrounds an outer circumference of the first pattern portion;

wherein the second pattern portion includes:
  a plurality of second patterns that have an arc shape, that are spaced apart from one another, that are arranged between an inner side of the second pattern portion and an outer side of the second pattern portion radially outward of the inner side of the second pattern portion, lengths of the plurality of second patterns increasing from the inner side of the second pattern portion to the outer side of the second pattern portion; and
  a plurality of second bridges that connect the plurality of second patterns in series, and wherein at least a portion of the pair of first connectors extends to a position between at least a pair of second bridges among the plurality of second bridges and defines a heating portion configured to generate heat based on a flow of electric current through the first annular heating zone.

* * * * *